Dec. 16, 1930.   T. O. MORRIS ET AL   1,784,995
MOLDING MACHINE
Filed March 12, 1929   3 Sheets-Sheet 2
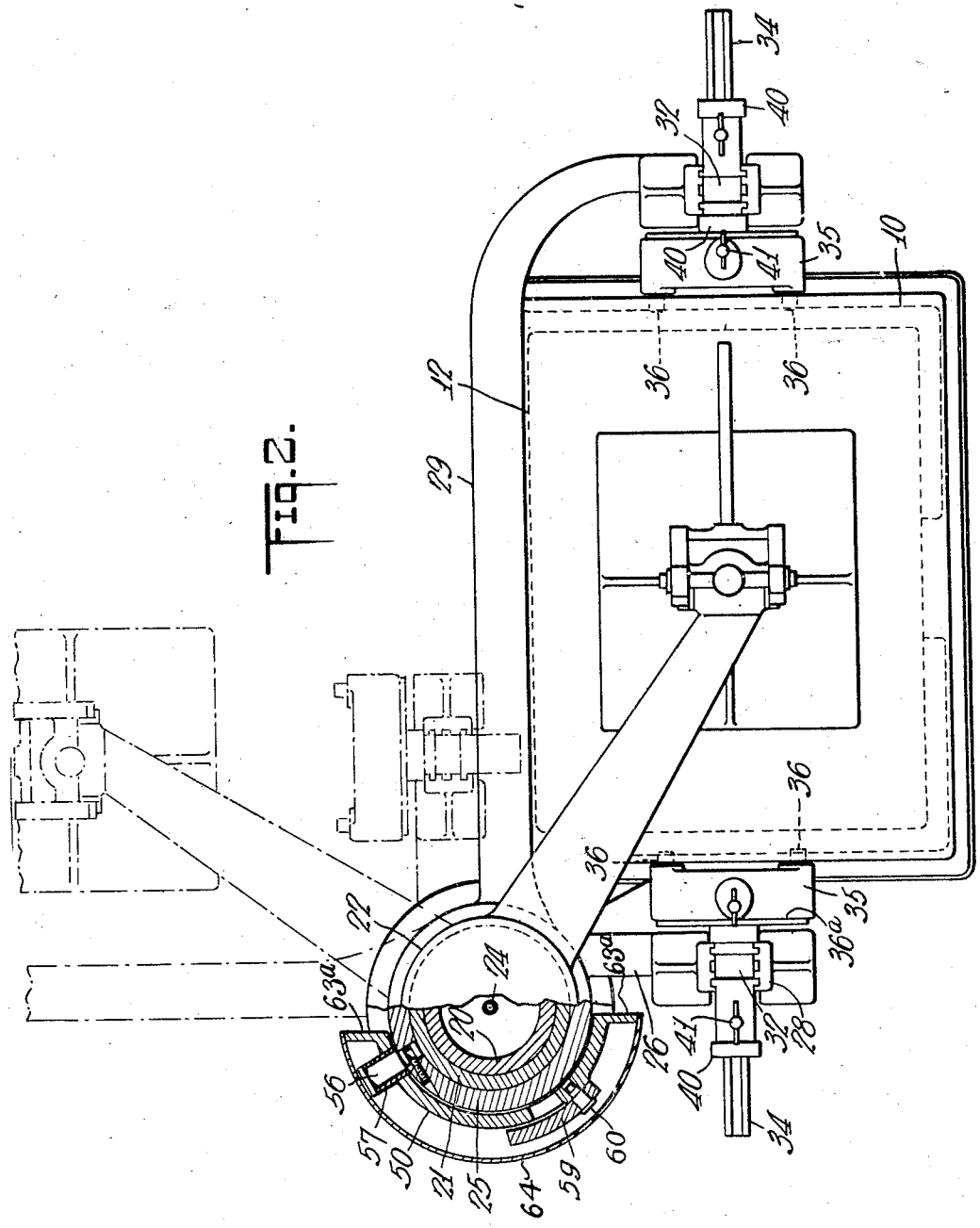
INVENTOR
Thomas O. Morris
John J. Lawlor
BY
ATTORNEY

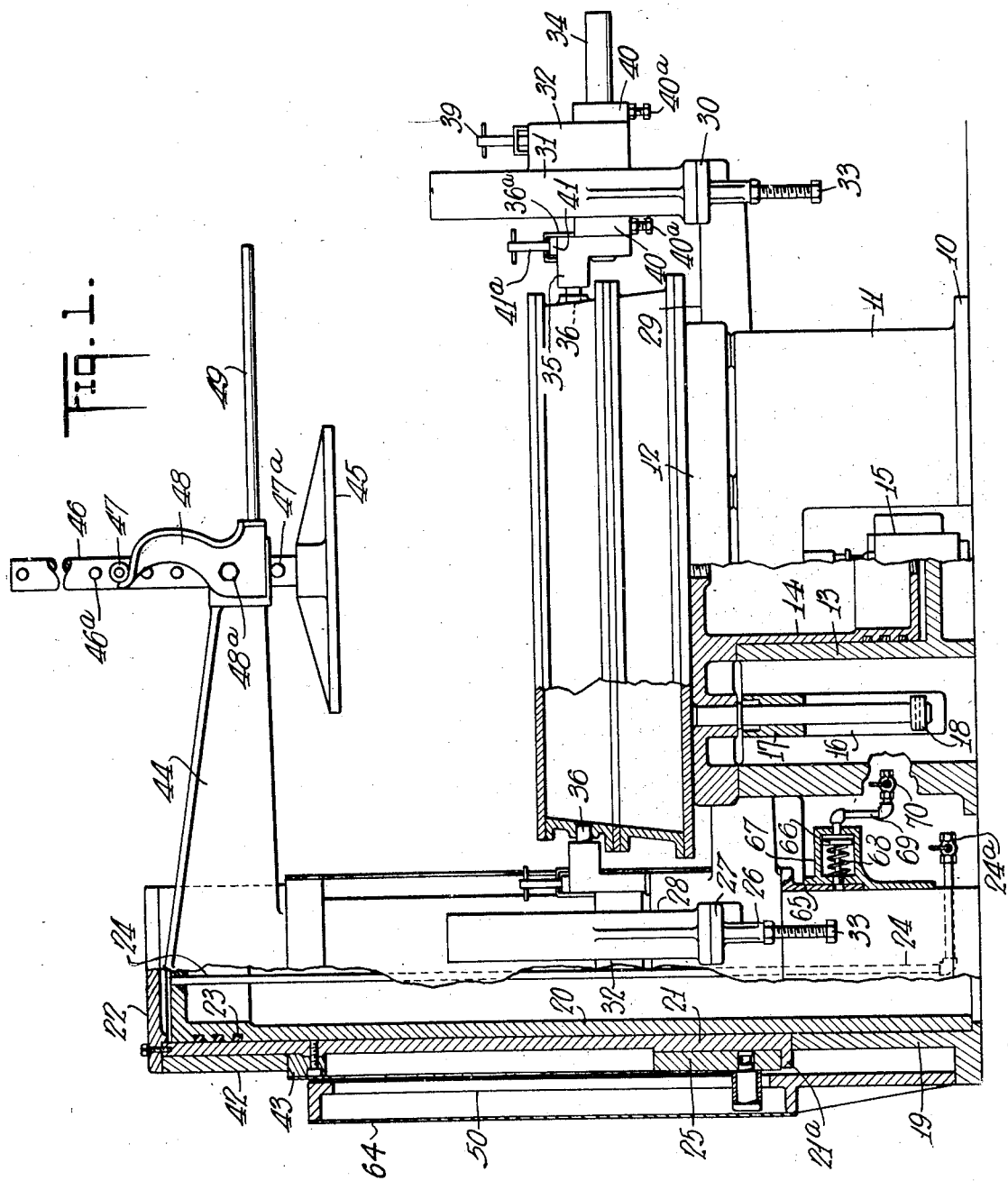

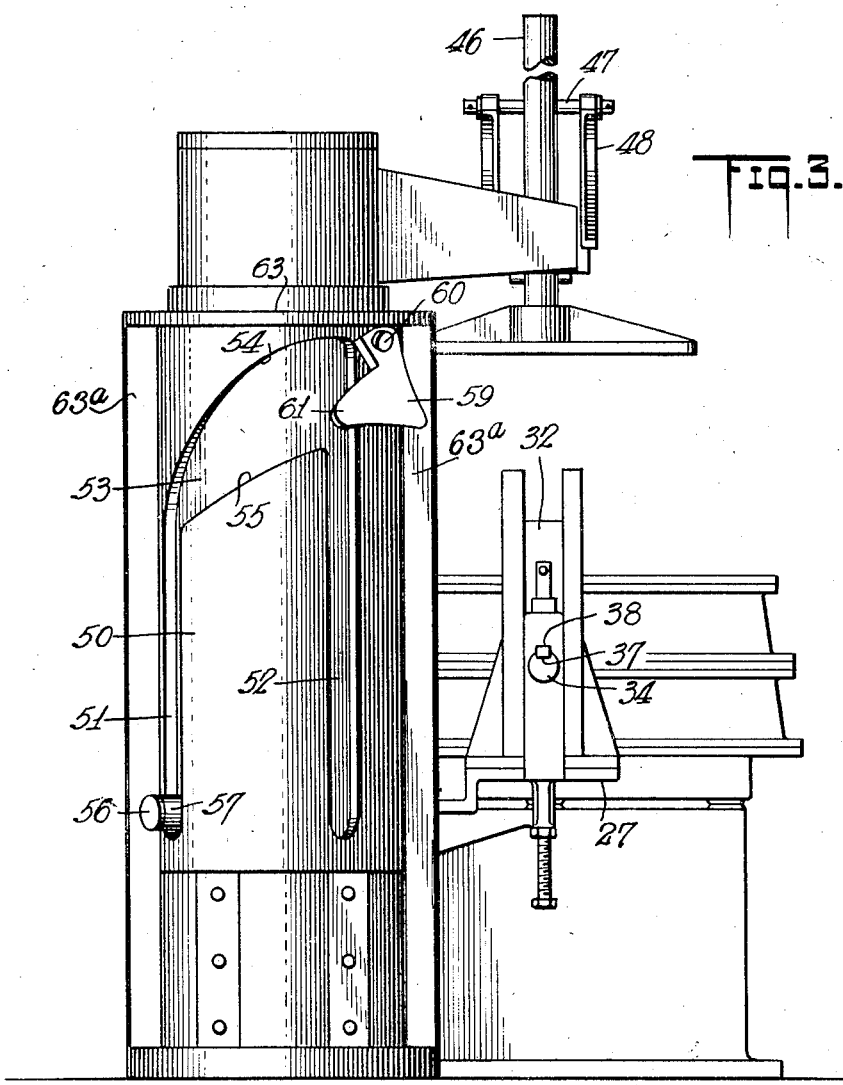
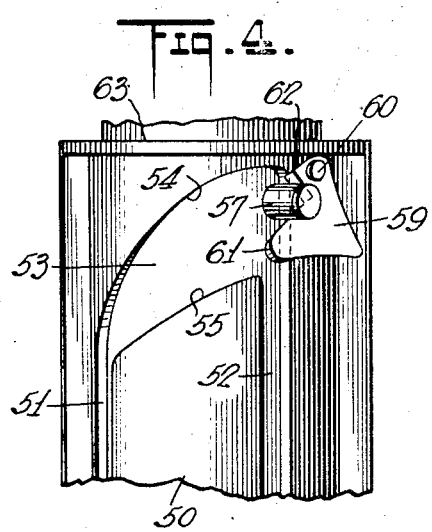
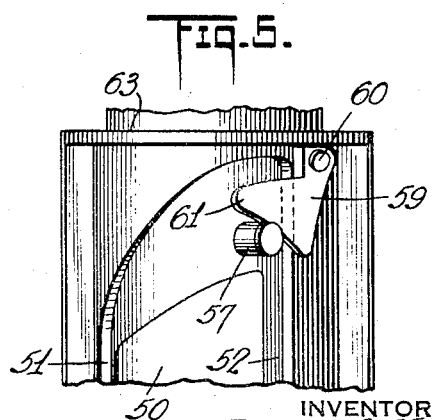

Patented Dec. 16, 1930

1,784,995

UNITED STATES PATENT OFFICE

THOMAS O. MORRIS, OF EASTON, PENNSYLVANIA, AND JOHN J. LAWLOR, OF PLAINFIELD, NEW JERSEY, ASSIGNORS TO AUTOMATIC MOLDING MACHINE CORPORATION, OF DOVER, DELAWARE, A CORPORATION OF DELAWARE

MOLDING MACHINE

Application filed March 12, 1929. Serial No. 346,352.

Our invention relates to molding machines and has for an object to provide an improved means for handling molds or flasks.

In most foundries overhead cranes are required to convey the molds to and from the molding machines which not only involves labor expense but also considerable loss of valuable time on the part of the operatives while they are waiting for the crane to handle the molds. It is an object of the present invention to economize labor, and also to dispense with the services of the overhead crane by providing the molding machine with means for swinging a flask from one position to another, as for instance from the table of the molding machine to a conveyor or a suitable outside support, or from the support to the table, as the case may be.

The present invention is an improvement on that disclosed in our co-pending application Serial No. 195,718, filed June 1, 1927. The machine described in said application comprises in general a table and a flask carrier which may be moved vertically so as that when it is necessary to turn the flask over the latter will clear the table. Means are also provided which operate automatically to swing the flask laterally when the carrier is raised above to the top of its vertical stroke so that when the carrier is subsequently lowered it will deposit the flask upon a suitable support outside of the machine. While the flask can thus be moved automatically away from the table, it will not return automatically but must be pushed manually back over the table when the carrier is at the top of its stroke. It is a specific object of the present invention to provide automatic flask handling mechanism which on one vertical rise will swing laterally in one direction and on the next vertical rise will swing laterally in the opposite direction; thus one rise and fall of the carrier will lift a flask off the support and place it on the table and the next rise and fall will lift it off the table and place it on the support. Of course it will be understood that the carrier may be moved empty to either of the two positions or in the case of a two part mold it may be operated on one swing away from the table to convey the drag to the support and on the next swing away from the table to carry the cope and place it upon the drag.

Means by which these and other objects of our invention are attained will be explained in the following description of a specific embodiment of our invention and the novelty and scope of the invention will thereafter be pointed out in the claims.

In the accompanying drawings:

Figure 1 is a front elevation of our molding machine, partly broken away to reveal interior details;

Fig. 2 is a plan view of our molding machine with a portion thereof in section;

Fig. 3 is an end elevation, looking from the left hand side of Figs. 1 and 2, with a cover plate removed; and Figs. 4 and 5 are fragmentary detail views of a portion of the mechanism illustrated in Fig. 3, but with certain parts in different positions.

In the drawings, we have used the numeral 10 to indicate the base of the molding machine. The base is formed with a bed 11 on which is supported a table 12, both the bed and the table being preferably rectangular. The bed 11 is formed with a central vertical cylinder 13 in which operates a plunger 14 connected or integrally formed on the table 12. Suitable valve mechanism 15 is provided whereby air or other fluid under pressure may be admitted into and exhausted from the cylinder 13 to cause the plunger and the table to be raised and lowered. We claim no novelty in the particular valve mechanism employed. It may be of the type in which air is admitted continuously to press the plunger steadily upward and which may also be operated to cause pulsation of air pressure so that a rapid reciprocating motion will be given to the table. The table 12 carries vertical guide rods 16, which slide in socket members 17 formed in the bed 11 and guide the movement of the table so as to prevent it from tilting. The guide rods are provided at their lower ends with heads 18 adapted to coact with the lower ends of the socket members 17 to limit the upward movement of the table.

At one side of the bed 11 the base 10 is formed with a cylindrical bracket 19 in which is supported and secured a vertical column 20. The latter is preferably located adjacent one corner of the table as indicated in Fig. 2. Fitted over the column is a sleeve or cylinder 21 which is adapted to slide on the column. The upper end of the cylinder is provided with a head 22 and the column is fitted with piston rings 23 to provide an air seal between the column and cylinder. The upper end of the column is closed except for an air pipe 24 controlled by a valve 24ª. By operating the valve air under pressure may be admitted into the space between the top of the column and the head 22, to raise the cylinder with respect to the column.

Mounted upon the cylinder 21 and resting upon a flange 21ª at the lower end of said cylinder, is a hub 25 from which projects a short arm 26 parallel to the adjacent end of the table 12. The end of the arm 26 provides a support 27 for a vertical pedestal or guide member 28. The hub 25 is also provided with a longer arm 29 projecting at right angles to the shorter arm. This longer arm passes to the rear of the base, below the level of the table when the parts are in their lowermost position and extends forward about the opposite end of the table, terminating in a support 30 for a guide member or pedestal 31 similar to the member 28. Each of these pedestals is provided with ways for a vertically slidable head 32. An adjustable stop, such as the screw 33, serves to limit the normal or low position of the slide head. Each head carries a horizontal shaft 34 which, on the end toward the table, is fitted with a trunnion head 35 secured thereto. In each trunnion head is a pair of pins 36 which may be moved into engagement with a flask. Each shaft 34 is formed with a keyway 37 adapted to be engaged by a key 38 which may be raised out of engagement with the keyway by means of the handle 39. The key engages the keyway when the trunnion head is holding the flask in inverted position as shown in Fig. 1. In this position the pins 36 lie above the shaft 34 and the flask when lifted off the table is in unstable equilibrium. When the flask is turned over to normal position it is in stable equilibrium because the pins 36 lie below the shaft 34. Collars 40 are secured by set screws 40ª upon the shaft 34 on opposite sides of the slide head 32. It will be understood that for different sizes of flasks the shaft must be adjusted lengthwise, which may readily be done by loosening the set screws 40ª and, after the shaft has been adjusted, tightening the set screws to hold the shaft at the desired adjustment. The pins 36 are pressed toward the flask by springs (not shown) and are connected by a yoke 36ª against which bears an eccentric 41. The latter may be turned by a handle 41ª when it is desired to retract the pins from engagement with the shaft.

Mounted to turn freely on the upper end of the cylinder 21 is a hub 42 fitted between the head 22 and a collar 43 secured to the cylinder 21. The hub 42 is formed with an arm 44 which at its outer end carries a ram-head 45. The ram head has a vertical shaft 46 which passes through a bearing in the outer end of the arm 44, and this shaft is formed with apertures 46ª in which may be inserted a pin 47. Mounted on the outer end of the arm 44 are two cam arms 48 which may be swung about their axes 48ª by means of a lever 49. By operating the lever 49, the cams may be turned so as to engage the pin 47 and lift the ram-head out of operative position or to the position shown in Fig. 1. A pin 47ª is inserted in an aperture 46ª under the arm 44 to limit upward movement of the ram-head when desired.

Secured to the bracket 19 is a cylindrically curved cam plate 50 which partly surrounds the cylinder 21. As shown in Fig. 3, the cam 50 is formed with two vertical slots 51 and 52, which are connected at the top by an inclined broad slot 53 which widens toward the slot 52. The slot 53 is, therefore, formed with two spiral walls 54 and 55 respectively connecting the inner and outer walls of the vertical slots 51 and 52. Fixed in the hub 25 is a pin 56 which carries a roller 57 adapted to engage the grooves in the cam 50.

With the parts in the position shown in Fig. 3, it will be evident that when the cylinder 21 is raised the roller 57 while in the slot 51 will keep the hub 25 from turning, but when it enters slot 53 and engages the wall 54 it will cause the hub 25 to rotate on its axis to the position shown in Fig. 4, or that shown by broken lines in Fig. 2. Now when the air pressure is relieved and the cylinder 21 is permitted to return by gravity to its original position, the roller will move down the slot 52. Upon the next application of air pressure to raise the cylinder 21, the roller 57 will be guided up the slot 52 and, in order to cause the hub to swing around to its original position, we have provided a trigger mechanism which will move the roller out of the slot 52 and over the spiral wall 55, so that on relieving the air pressure in the cylinder 21 the roller will move down the spiral wall 55 and be guided thence to the vertical slot 51 thereby returning the hub to its original position.

The trigger mechanism is shown clearly in Figs. 3 to 5 inclusive. It consists of a trigger 59 of substantially triangular form which is pivoted near one corner thereof upon a pin 60. The trigger is slightly curved to conform to the curvature of the cam 50. The weight of the trigger is so distributed that it will normally hang in the position shown in Fig. 4 with the nose 61 projecting across the outer wall of the vertical slot 52. When the roller 57 moves downward from the position shown in Fig. 4, it will swing the nose 61 out of its path, but on the next upward movement of the cylinder, the roller will encounter the nose 61 of the trigger 59 and because of the angular relation of the nose 61 to the pivot pin 60, the trigger will be swung to the position shown in Fig. 5. When in this position a shoulder 62 on the trigger engages a flange 63 at the top of the cam plate 50 which serves as a stop for the trigger, and as the roller rises it is compelled to move toward the slot 51. Then upon relieving the air pressure supporting the cylinder 21, the roller will strike the wall 55 and roll down toward the slot 51, swinging the hub 25 to its original position, as shown in full lines in Fig. 2. Secured to the flange 63 and similar flanges 63a formed at the remaining margins of the cam plate is a cover plate 64 which serves to protect the cam and trigger mechanisms.

Depending from the hub 25 is a plate 65 which is adapted to be engaged by a plunger 66 mounted to slide in a small cylinder member 67 carried by the bracket 19. Normally the pin 66 is held in retracted position by a spring 68, but the bearing member 67 is connected by a pipe 69 with a suitable source of air pressure; when air is introduced it will displace the pin 66 and force it into engagement with an aperture in the plate 65. By this means the hub and cylinder may be locked in the lowermost position shown in Fig. 1 for certain operations of the machine, as will be described presently.

The operation of the machine is as follows:
A flask is placed upon the table with the cope at the bottom and the drag at the top and a pattern plate between the two parts of the flask. The flask is then seized by the trunnion pins 36 upon operating the handles 41a to release the pins. The drag is then filled with sand and a mold plate or board is placed over the top of the flask on the drag. The arm 44 is then swung around to such position that the ram-head will overlie the mold and lever 49 is operated to release the shaft 46 and permit the ram-head to drop. Thereafter the valve mechanism 15 is operated to raise and reciprocate the table so that the flask will rap against the ram-head and the sand will thereby be jarred about the pattern. Finally the valve mechanism 15 is operated to press the mold against the ram-head and squeeze the sand into a compact mass.

This done the table is lowered and the ram-head is swung out of the way. Then valve 24a is operated to raise the cylinder 21 and thereby lift the flask clear of the table 12 sufficiently to permit of rolling it over, but not so far that the roller 57 will pass out of the cam slot 51. The flask is then inverted and the keys 38 are introduced into the key-ways 37 of the shafts 34 so as to lock the trunnion heads against turning. The flask is then lowered upon the table, in the position shown in Fig. 1, with the drag at the bottom and the cope at the top. The cope is now filled with sand which is jarred and compressed in the same manner as described above. The next step is to remove the flask from the machine and to this end valve 24a is operated to lift the cylinder 21 to the top of its vertical stroke. The roller 57 then riding along the cam wall 54, will swing the flask laterally over a suitable support (not shown) and on relieving the air pressure cylinder 21 the flask will be lowered upon said support, the roller 57 riding down the cam slot 52. The eccentrics 41 are then operated to release the flask. Air pressure is again admitted to cylinder 21 causing the latter to rise and the pin 57 on striking trigger 59 will be swung laterally over the wall 55, so that upon relieving the pressure in the cylinder, the roller 57 will be guided back into cam slot 51, returning the trunnion heads 32 to their original position at each end of the table 12. It will be understood that the cylinder 21 does not necessarily turn when the hub 25 is turned by the coaction of roller 51 with the cam slots and neither the cylinder 21 nor the hub 25 partake of the reciprocating motion of the table 12, because the slide heads 32 are free to rise and fall in the members 31. In fact the hub is preferably locked in lowered position by operating the valve 70 to force the plunger into engagement with the plate 65 while the sand is being jarred.

There are other ways in which our machine may be used. For instance, the cope and the drag may be separately handled in the machine and then assembled upon the outside support by successive reciprocations of the cylinder 21. Furthermore, we wish it to be understood that while we have described a preferred embodiment of our invention we do not limit ourselves to the specific construction shown, but consider ourselves at liberty to make such variations, alterations and modifications, as fall within the spirit and scope of the following claims:

We claim:

1. In a molding machine, a carrier, means for vertically reciprocating the carrier, and means operating to swing the carrier laterally in one direction on one vertical reciprocation and in the opposite direction on the next reciprocation.

2. In a molding machine, a carrier, means for vertically reciprocating the carrier, and means operating to swing the carrier laterally in one direction on one vertical reciprocation and in the opposite direction on the next reciprocation, the latter means operating only when the carrier is raised above predetermined limits.

3. In a molding machine, a carrier, means for vertically reciprocating the carrier, and means operating to swing the carrier laterally in one direction on one vertical reciprocation and in the opposite direction on the next reciprocation, the latter means operating only when the carrier nears the top of its stroke.

4. In a molding machine, a vertically movable member, a carrier journaled thereon and capable of movement angularly about such member as an axis, and means compelling angular movement of the carrier, first in one direction and then in the other, upon alternate reciprocations of said member.

5. In a molding machine, a vertically movable member, a carrier journaled thereon and capable of movement angularly about such member as an axis, means compelling angular movement of the carrier, first in one direction and then in the other upon alternate reciprocations of said member, and means for preventing such angular movement until said member nears the top of its stroke.

6. In a molding machine, a carrier mounted to reciprocate vertically and also to swing angularly about a vertical axis, guiding means for maintaining the carrier in either of two angular positions as it is vertically reciprocated, and means operating as the carrier nears the top of its stroke to swing the carrier from one angular position to the other and vice versa on alternate vertical reciprocations of the carrier.

7. In a molding machine, a carrier, means for vertically reciprocating the carrier, a cam formed with two angularly spaced vertical grooves, a pin on the carrier adapted to ride in said grooves and means at the top of said grooves for swinging the pin from one groove to the other and vice versa upon alternate vertical reciprocations of the carrier.

8. In a molding machine, a carrier adapted to reciprocate vertically and swing angularly about a vertical axis, a cam formed with two angularly spaced vertical grooves and an inclined transverse groove connecting the vertical grooves at their upper ends, a pin on the carrier adapted to ride in said grooves and control the angular position of the carrier, said transverse groove guiding a pin from one vertical groove to the other, upon one vertical rise of the carrier, and a trigger operating to guide the pin out of the latter groove and into the transverse groove upon the next vertical rise of the carrier.

9. In a molding machine, a carrier adapted to reciprocate vertically and also to swing angularly about a vertical axis, a cam formed with two angularly spaced vertical grooves, one of the grooves being longer than the other and a transverse groove upwardly inclined from the top of the shorter groove to the top of the longer groove, a pin on the carrier adapted to ride in the cam grooves and control the angular position of the carrier, a pivoted trigger having a nose thereof normally projecting across the longer groove and adapted to be swung out of the way by the pin upon downward movement of the latter in said longer groove and to be swung inward across the path of the pin upon upward movement of said pin, and a stop to limit the inward swing of the trigger and compel lateral movement of the pin into said transverse groove.

10. In a molding machine, a table, a flask carrier, means for reciprocating the flask carrier vertically, and means operating on alternate reciprocations of the carrier to move the carrier toward and from operative position with respect to the table.

11. In a molding machine, a table, a vertically movable cylinder, a fixed vertical column fitted within the cylinder and serving as a plunger therefor, means for charging air into and discharging air from the cylinder to effect vertical movement thereof, a flask carrier journaled upon the cylinder, means for causing the flask carrier to move angularly toward operative position with respect to the table upon one vertical reciprocation of the cylinder and away from such operative position upon the next vertical reciprocation of the cylinder.

12. In a molding machine, a table, a vertically movable cylinder, a fixed vertical column fitted with one cylinder and serving as a plunger therefor, means for charging air into and discharging air from the cylinder to effect vertical movements thereof, a flask carrier journaled upon the cylinder, means operating only when the cylinder is near the top of its stroke for causing the flask carrier to move angularly toward operative position with respect to the table upon one vertical stroke of the carrier and to move angularly in the opposite direction upon the next vertical stroke of the carrier.

13. In a molding machine, a table, a vertically movable cylinder, a fixed vertical column fitted within the cylinder and serving as a plunger therefor, means for charging air into and discharging air from the cylinder to effect vertical movements thereof, a flask carrier supported on and movable angularly about the cylinder, a cam formed with two angularly spaced vertical grooves, a pin on the carrier adapted to ride in said grooves, and means for guiding the pin from the top of one groove to the top of the other upon one reciprocation of the cylinder and for guiding the pin from the latter groove to the former groove upon the next reciprocation of the cylinder.

In testimony whereof, we have signed this specification.

THOMAS O. MORRIS.
JOHN J. LAWLOR.